June 26, 1956 — C. U. GRAMELSPACHER — 2,751,946
PANEL AND METHOD OF MANUFACTURE

Filed Nov. 3, 1951 — 4 Sheets-Sheet 1

INVENTOR
CLARENCE U. GRAMELSPACHER
BY Toulmin & Toulmin
ATTORNEYS

June 26, 1956  C. U. GRAMELSPACHER  2,751,946
PANEL AND METHOD OF MANUFACTURE
Filed Nov. 3, 1951  4 Sheets-Sheet 2
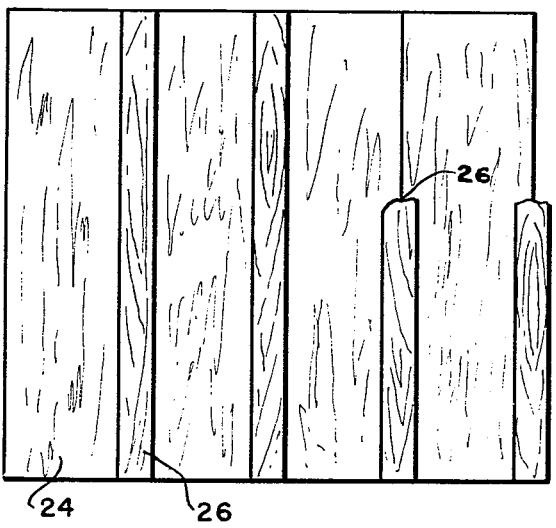
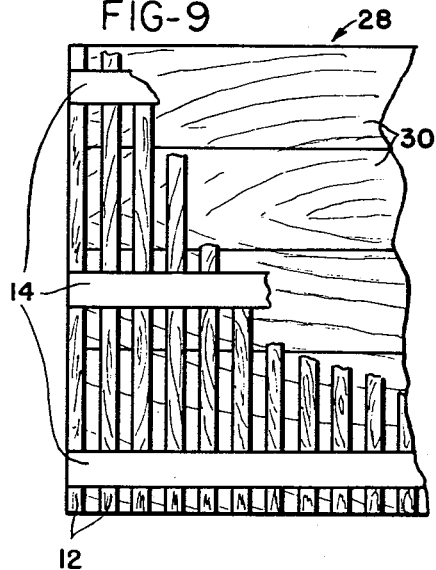
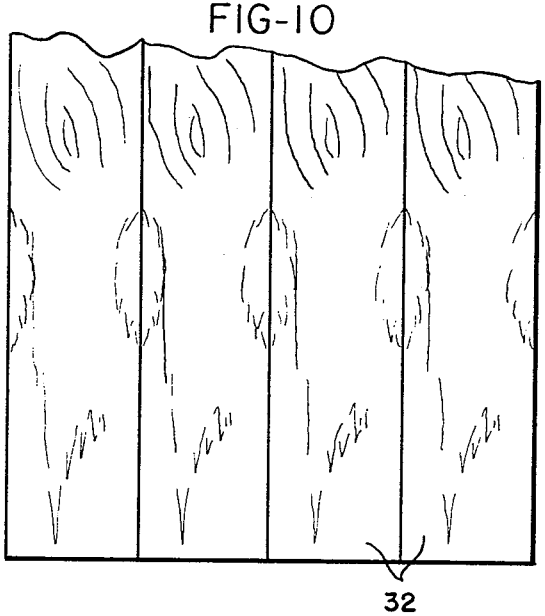
INVENTOR
CLARENCE U. GRAMELSPACHER
BY Toulmin & Toulmin
ATTORNEYS June 26, 1956 C. U. GRAMELSPACHER 2,751,946
PANEL AND METHOD OF MANUFACTURE
Filed Nov. 3, 1951 4 Sheets-Sheet 3
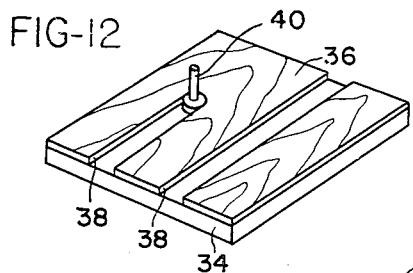
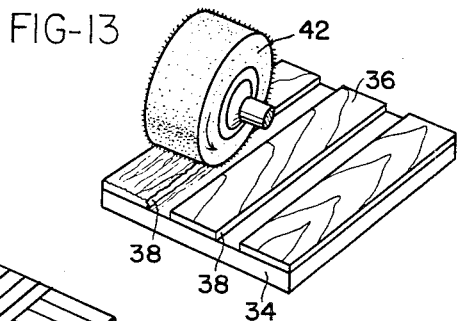
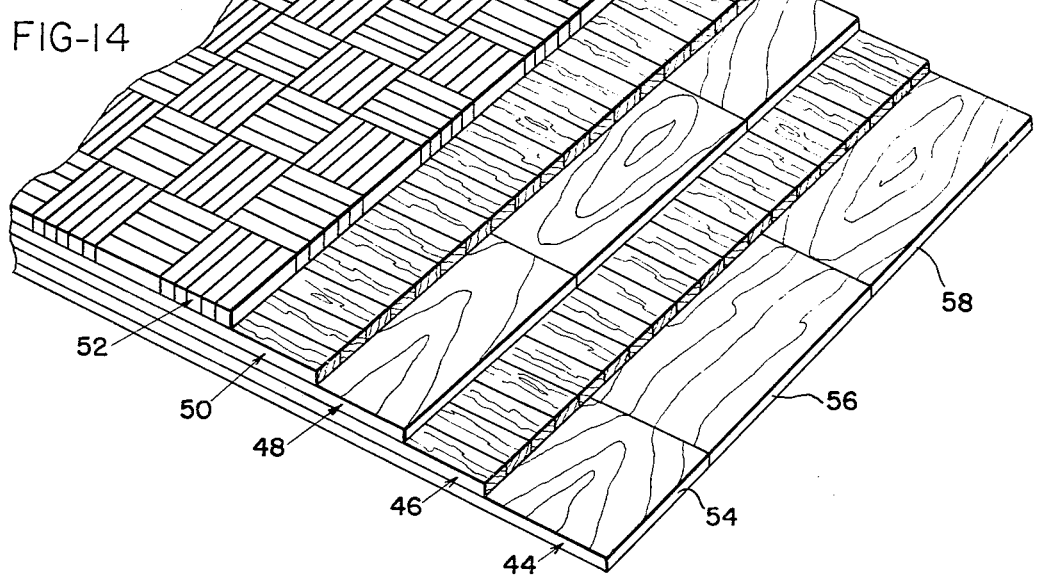
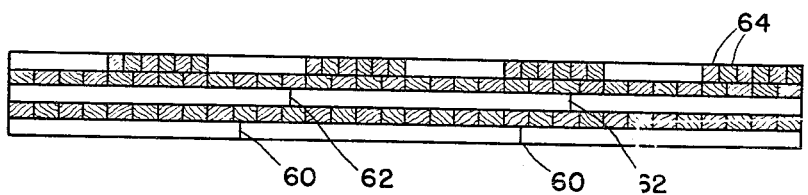
INVENTOR
CLARENCE U. GRAMELSPACHER
BY Toulmin & Toulmin
ATTORNEYS June 26, 1956 C. U. GRAMELSPACHER 2,751,946
PANEL AND METHOD OF MANUFACTURE
Filed Nov. 3, 1951 4 Sheets-Sheet 4

INVENTOR
CLARENCE U. GRAMELSPACHER
BY *Toulmin & Toulmin*
ATTORNEYS

United States Patent Office 2,751,946
Patented June 26, 1956

2,751,946

PANEL AND METHOD OF MANUFACTURE

Clarence U. Gramelspacher, Jasper, Ind., assignor to Gramwood of Indiana, Jasper, Ind., a corporation of Indiana Application November 3, 1951, Serial No. 254,760

4 Claims. (Cl. 144—309)

This invention relates to panels formed of wood, particularly plywood panels and to methods of manufacturing such panels. More particularly still, this invention relates to panels of the nature referred to which are made up of strips or pieces glued or cemented together and thereafter finished.

In the processing of woods, especially veneers, it is practically always necessary to carry out one or more trimming operations between the time the veneer is cut from the log until it is finally assembled with the panel or member with which it is to be used. Heretofore, most trimming of this nature were considered as scrap material and were discarded, or were processed through grinding operations to form a wood fiber or wood flour.

Such trimmings or clippings accumulate rapidly in the production of high quality veneered articles, particularly, with radio and television cabinets. Also, the extremely rigid requirements of such high quality production lead to a great deal of rejected veneer lay-backs, shorts, and the like which are also considered as scrap.

Having the foregoing in mind, this invention has, for its particular object, the provision of a method of utilizing such trimmings and other small and otherwise unusable pieces or strips of wood veneer such that a valuable article can be made.

A still further object of this invention is the provision of a panel made up of strips of veneer such as trimmings or waste strips secured together and the article finished.

Another object of this invention is the provision of a plywood panel and a method of making the panel such that while only relatively narrow pieces are employed in making up the panel, a relatively large member can be constructed which exhibits unusual strength.

A particular object of this invention is the provision of a plywood panel and a method of making the same such that unusual decorative effects can be had.

A still further object is the provision of a relatively small plywood panel and the method of making the same which can be utilized in the construction of larger panels by assembling the small panels on a larger backing sheet.

Because of the highly attractive decorative effect that has been obtained in making up panels from scrap strips of veneer according to the present invention, in many cases the demand for a particular type panel exceeds the supply that can be had merely by utilizing scrap veneer, and in view of this, it is a still further object of the present invention to provide a veneered plywood panel and a method of making the same wherein first-grade pieces of veneer are employed in the manufacture, as well as lower grade flitch stock.

A still further particular object of the present invention is the provision of a veneered plywood panel and a method of making the same utilizing either scrap strips and trimmings of veneer, or first-grade veneer strips or sheets in which a relieved pattern is obtained on the finish side of the assembled panel.

These and other objects and advantages will become more apparent upon reference to the following description taken in connection with the accompanying drawings in which:

Figure 8 is a view similar to Figure 3 but showing how the veneer strips can be trimmed to size and placed edge to edge on the backing sheet;

Figure 9 is a view like Figure 3, but showing the backing sheet made up of strips of veneer laid edge to edge and extending to a direction transverse to the direction of the veneer strips on the surface of the panel;

Figure 10 is a view like Figure 8, but showing how a matched pattern can be obtained by laying up matching veneer strips in edge to edge relation;

Figure 11 is a view showing a panel made up with strips of veneer on the surface which alternate in color, for example, light and dark;

Figure 12 is a perspective view showing the manner in which a panel can be made up with either a single sheet of veneer on the face, or a continuous veneer facing made up by strips or pieces in edge to edge relation and then grooves formed in the veneer facing by a suitable cutter;

Figure 13 is a view of the same panel as is shown in Figure 12, but showing it being traversed by the brush which will so modify the surface of the panel to give it a rustic effect;

Figure 14 is a perspective view showing how a large panel can be made up of relatively small pieces, but in such a manner that there are no planes of weakness that extend completely through the assembled panel;

Figure 15 is a transverse sectional view taken through the panel of Figure 14 showing the manner in which the various parts thereof are laid up so that there are no through joints anywhere in the panel;

Figure 1:
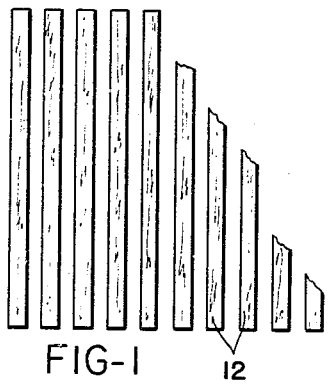
Figure 1 is a view showing the manner of laying up strips of veneer such as trimmings or scrap pieces in spaced relation prior to taping the pieces together for applying them to a backing sheet.
Figure 2:
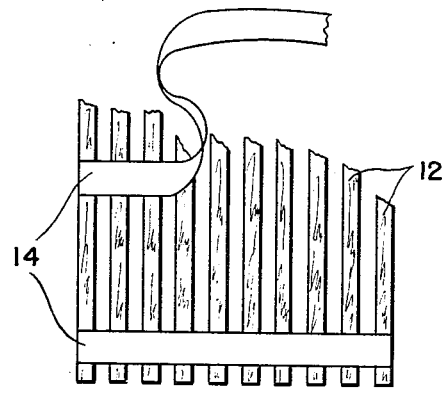
Figure 2 is a view like Figure 1, but shows the strips with the tape being applied.
Figure 3:
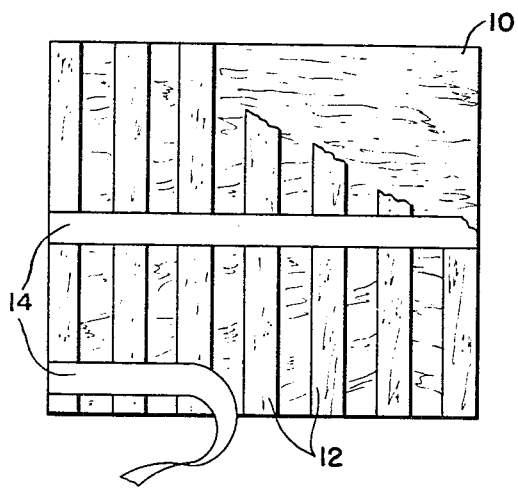
Figure 3 is a view which shows the veneer strips applied to a backing sheet or baseboard.

Referring to the drawings somewhat more in detail, the panel that is illustrated in the drawings in Figures 1 through 5 consists of a backing sheet or baseboard 10 which may consist of a single sheet of wood or which may be built up in the form of a plywood panel according to conventional practices. In order to provide the panel according to this invention, a plurality of strips 10 of wood veneer 12 are arranged in spaced and generally parallel relation, as indicated in Figure 1, and these strips are taped together in a conventional manner as by the tapes 14 in Figure 2. After the strips are taped together, they are glued or cemented according to established practices to the backing sheet 10, as indicated in Figure 3. After the glue or cement has set up, the tapes 14 can then be removed and the panel is ready for the finishing operation.

Figure 4:
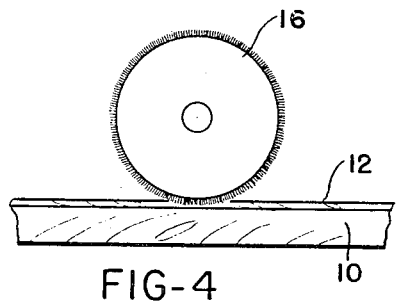
Figure 4 is a sectional view taken through the panel of Figure 3 showing the manner of treating it with a wire brush in order to obtain one of the finishes contemplated by this invention.
Figure 5:
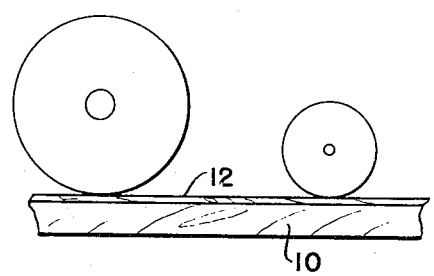
Figure 5 is a view like Figure 4, but showing the panel at a later stage in the processing thereof and during which it is sanded and finished, when the finishing process includes these steps, it being understood that at least the sanding is not always required.
Figure 7:
Figure 7 is a cross-sectional view through a panel looking endwise at the veneer strips and after it has been processed through the brushing operation of Figure 4 showing how said operation tends to dig out the soft grain of the veneer strips and also of the backing sheet and to round off the edges of the veneer strips.

An important step in the finishing of panels, according to that phase of my invention by which is obtained one of the preferred decorative effects, is to brush the panel with a wire brush as indicated at 16 in Figure 4. Wire brush 16 is relatively stiff and operates to dig out at least a part of the soft grain of the veneer strips and also of the backing sheet 10 and likewise rounds the edges of the veneer strips, all as will be seen in Figure 7.

Following this step, the panel is sanded if desired, although this step is not necessary, in order to give it a smooth top surface, but is not sanded to an extent which will eliminate the grooves dug out by the wire brush 16. Thereafter, a number of different finishing effects can be obtained depending on the particular manner the finishing materials are applied, and the particular finishing materials employed.

For example, a light colored filler material can be placed on the panel in order to at least partly fill the dug-out portions and thereafter a clear coat applied. Stains and other finishes can also be employed, if desired. The net result, as regards the appearance of the panel, is to create a highly unusual decorative effect which cannot be arrived at by the usual processing of plywood panels.

Figure 6:
Figure 6 is a fragmentary view showing the appearance of a panel in which the veneer strips are irregular as to width and outline.

A variation of the basic panel referred to above can be had by the arrangement shown in Figure 6 where the individual veneer strips 18 vary widely as to width and may also have their longitudinal edges formed in an irregular manner, this irregularity either being deliberately cut along the edges of the strips or being a natural consequence of their formation during other processing. The strips 18 can be arranged at varied spacing as illustrated, and the net result in this case, so far as the appearance of the panel is concerned, is to produce an ancient and antique appearance after the panel has been brushed and finished.

A still further variation of the basic pattern is illustrated in Figure 11 wherein the alternate veneer strips 20 and 22 are of contrasting colors, for example, one light and one dark. These strips can be arranged in a uniform manner as shown, and may be uniform in width, or may be varigated in width and spacing, as is illustrated in Figure 6.

In any of the examples of my invention described above, it will be understood that scrap pieces of veneer or trimmings thereof are preferably employed whereby what is normally a waste product can be converted into a valuable and attractive article of commerce and without any expensive or involved processing being required. However, it is also contemplated according to this invention, to utilize prepared veneer strips in order to meet demands for the product which exceed the supply which can be had from using merely scrap veneer and trimmings thereof. Accordingly, it will be understood that in any case it is contemplated to practice this invention with both scrap veneer and trimmings and with first-grade veneer strips, as well as with lower grade flitch stock.

In Figure 8 there is illustrated an arrangement wherein there are veneer strips 24 laid in edge to edge relation on a backing sheet which may be regular plywood, and the joints between which may be covered by the narrower veneer strips at 26. It will be evident that the panel of Figure 8 is similar to the panels described previously, in that a three-dimensional effect is obtained due to the raised surface of the strips 26. This effect can be further enhanced and the panel made to appear ancient by brushing the surface as illustrated in Figure 4. However, the panel of Figure 8 can also be finished without the brushing operation, if so desired.

In Figure 9, I illustrate an arrangement substantially the same as described in Figures 1 through 3, except that the backing sheet or regular plywood sheet 28 is made up of individual strips 30 arranged in edge to edge relation so that not only is the surface layer of the Figure 9 panel adapted for being made up of scrap and trimmings, but the backing sheet as well can be formed in this manner. The entire panel, therefore, as disclosed in Figure 9, can be made up of what would normally be waste material.

In Figure 10 there is illustrated a panel which may be constructed in any of the manners heretofore described and wherein the individual pieces of veneer indicated at 32 are matching rejects or lay-backs and which may be placed in an edge to edge manner in order to provide a developed surface pattern for the panel.

In Figures 12 and 13 is shown an arrangement whereby the backing sheet 34 may have applied thereto a veneer facing 36, and this veneer facing formed into a relieved third-dimensional surface by the slots or grooves 38 formed therein by the cutter or routing member 40. In this manner, panels that are already made up may be converted into a novel three-dimensional pattern according to my invention, or panels, according to my invention, may be constructed by utilizing conventional practices and conventional equipment up to the point in the process where the routing step of Figure 12 is carried out.

These panels can further be treated in accordance with the teachings of the present invention by utilizing the wire brush 42 of Figure 13, in order to gouge out the soft grain of the veneer facing and the backing sheet.

In Figure 14, I have illustrated a manner of making up large wall panels by utilizing narrow strips and pieces, but in such a manner that the resulting panel is extremely strong. The manner of doing this will be apparent upon reference to Figures 14 and 15, and in which, it will be understood the thicknesses of the individual layers of wood have been exaggerated in order to make the manner of constructing the panel perfectly apparent. The panel, according to Figures 14 and 15 comprises a backing layer 44, cross-banding 46, a core sheet 48, other cross-banding 50 and veneer facing 52.

Backing sheet 40 and core sheet 48 are made up of a plurality of individual strips 54, 56 and 58, which are selected in width so that the joints between these individual strips in backing sheet do not coincide with the corresponding joints in the core sheet. This will be observed best in Figure 15 where the joints between the individual strips in the backing sheet are indicated at 60 and the corresponding joints between the individual strips of the core sheet are indicated at 62. The cross-banding at 46 and 50 can be arranged to run in the direction illustrated or can run at right angles thereto or may be arranged one to run in one direction and one in the opposite direction, depending on individual preference, but it will be noted in Figure 15 that when the cross-banding is arranged as shown, none of the joints of the individual strips of cross-banding coincide with any of the joints 60 or 62.

The assembly of the core sheet, backing sheet and cross-banding is thus extremely strong. According to the present invention, the veneer face sheet 52 is preferably made up of a plurality of relatively narrow short veneer strips 64, in accordance with any of the methods previously described.

Figure 16:
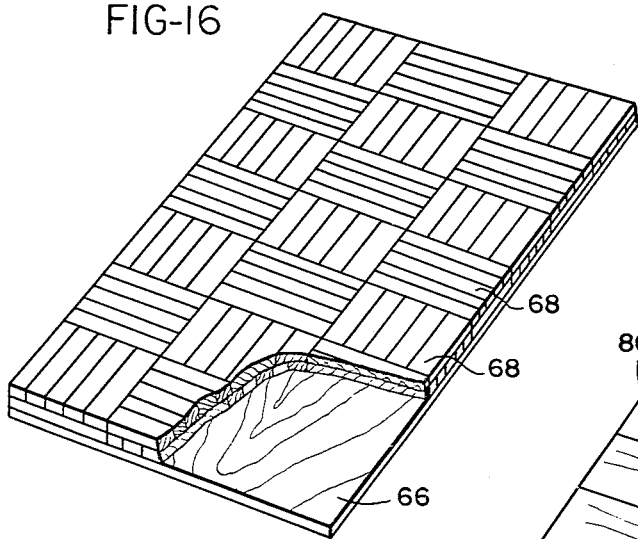
Figure 16 is a perspective view showing a panel similar to the one shown in Figure 14, but laid up in a somewhat different fashion.

This invention also contemplates an improved method of manufacturing large panels of the nature illustrated in Figures 14 and 15 characterized by constructing a large panel by mounting on a backing sheet of the desired size a plurality of smaller unit panels constructed according to any of the described methods. The advantage of a manufacturing process of this nature is that the small panels are more easily processed, require smaller machinery, are easier to handle and can be discarded if found faulty without involving much cost. After the unit panels have been processed up to the point of finishing, they can then be assembled on the backing sheet and the finishing of the large panel completed. In Figure 16 the backing sheet is represented by reference numeral 66 and affixed thereto are the plurality of unit panels 68 arranged in edge to edge relation according to the desired pattern.

Figure 17:
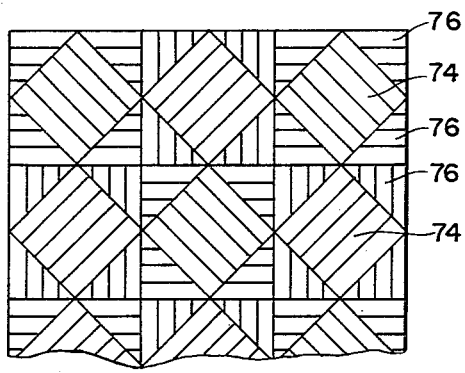
Figure 17 is a view looking in at the face of a large panel built up of a plurality of smaller panels and arranged according to a somewhat different pattern than is illustrated in Figures 14 and 16.
Figure 18:
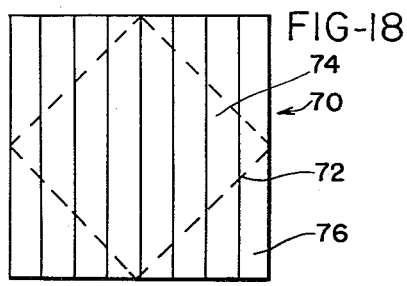
Figure 18 is a view showing the manner of cutting small panels to form the elements from which the panel of Figure 17 is made up.

In Figures 17 and 18, I disclose a method of making a panel of the type illustrated in Figure 16 wherein a diamond effect is obtained. This is done by taking a unit panel 70 and cutting off the corners thereof as along the line 72 in Figure 18. The resulting square center part 74 of the unit panel is placed on the backing sheet, as will be seen in Figure 17, and the triangular shaped corner pieces 76 are utilized for filling in the corners of the large panel and the spaces between the square parts 74.

Figure 19:
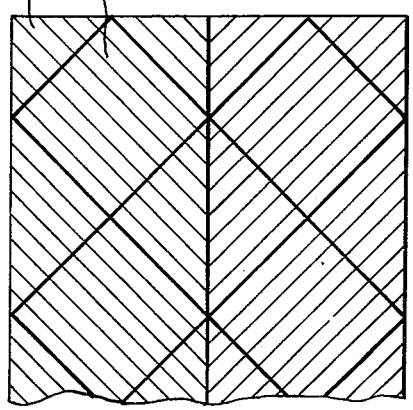
Figure 19 is a view of still another type of large panel that can be made up from elements of the nature illustrated in Figure 18.

The panel of Figure 19 can be arrived at in much the same way as the panel in Figure 17, with the essential difference being that the central square part 74 of the unit panel and the cut-off corner parts 76 are so arranged that the strips of veneer thereon are all in the same direction.

Figure 20:
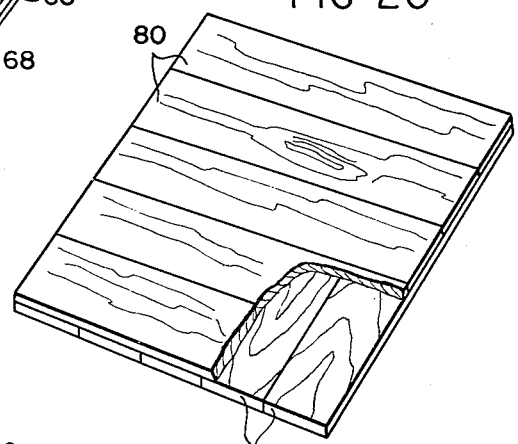
Figure 20 is a perspective view of a small panel showing both the faces thereof formed of relatively narrow strips of veneer laid in edge to edge relation.

Figure 20 illustrates one of the preferred manners of making up the unit panels. The panel illustrated in Figure 20 comprises the strips 78 laid in edge to edge relation to form the backing sheet of the panel and the strips 80 arranged in edge to edge relation and running at right angles to strips 78 to form the surface of the panel. Both of the sets of strips can be scrap or trimmings or can be strips specifically manufactured for the purpose.

From the foregoing it will be seen that my invention is concerned with the use of small pieces of veneer that accumulate in great quantity during manufacturing processes and the use of these small pieces to form valuable articles of commerce. In this manner, substantially worthless scrap pieces of veneer, such as clippings, shorts, lay-backs, and other rejects can be processed and considerable profit realized therefrom.

However, this invention is not limited to that particular phase, but also contemplates the use of relatively small pieces of veneer for making up large panels, and the working of veneered panels to simulate the three-dimensional effect obtained by the use of scrap strips.

As brought out, this invention also contemplates utilizing first-grade veneer and lower grade flitch stock in the manner described to produce valuable articles of commerce.

It will be understood that this invention is susceptible to modification in order to adapt it to different usages and conditions and, accordingly, it is desired to comprehend such modifications within this invention as may fall within the scope of the appended claims.

I claim:

1. The method of making a plywood panel having a three-dimensional surface comprising; fixing a veneer layer to a backing sheet to form a panel, and cutting grooves in the veneer layer in the general direction of the grain thereof, said grooves extending at least through the veneer layer so as to expose the backing sheet, and working the surface of the panel to dig material out from the exposed soft grain.

2. The method of manufacturing a plywood panel comprising the steps of (a) arranging waste strips of wood veneer in spaced relation; (b) interconnecting the thus arranged strips with removable material to form a unit thereof; (c) fixing the said unit to a backing sheet; (d) removing the material that interconnected the strips together to form a unit thereof; and (e) wire brushing the assembled unit of strips and the backing sheet.

3. The method of manufacturing a plywood panel consisting of the steps of (a) arranging waste strips of wood veneer in spaced relation; (b) taping the thus arranged strips to form an assembly thereof; (c) bonding the assembly to a backing sheet of regular plywood and; (d) removing the tape by which the strips were secured together in the assembly; (e) wire brushing the assembly of strips and the plywood sheet with the brush running in a plane generally parallel to the direction of the grain in the said waste strips thereby to remove soft grain from the strips and also to clean the strips and the backing sheet of the bonding material; and (f) applying a finish to the brushed strips and backing sheet.

4. The method of building up a decorative plywood panel comprising; arranging waste strips of wood veneer in spaced relation, temporarily interconnecting the thus arranged strips to form an assembly, arranging other strips of wood veneer in edge to edge relation, bonding the other thus arranged strips to a backing sheet of regular plywood, and bonding to the other strips the assembly of waste strips, and wire brushing the assembly of waste strips and edge to edge strips.

References Cited in the file of this patent

UNITED STATES PATENTS

| | | |
|---|---|---|
| 1,870,221 | Babcock | Aug. 9, 1932 |
| 2,075,925 | Baldwin | Apr. 6, 1937 |
| 2,467,194 | De Witt | Apr. 12, 1949 |
| 2,479,870 | Rundquist | Aug. 23, 1949 |
| 2,505,789 | Norquist | May 2, 1950 |
| 2,556,884 | Muller | June 12, 1951 |
| 2,565,952 | Curran et al. | Aug. 28, 1951 |

OTHER REFERENCES

Modern Plywood, Thomas D. Perry, 1942, page 136.